(12) United States Patent
Tofts et al.

(10) Patent No.: US 7,633,928 B2
(45) Date of Patent: Dec. 15, 2009

(54) COMMUNICATION DATA METHOD AND SYSTEM FOR VOICE APPLICATIONS EXCECUTABLE BY USER EQUIPMENT

(75) Inventors: Christopher Tofts, Bristol (GB); Richard Taylor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 11/389,307

(22) Filed: Mar. 27, 2006

(65) Prior Publication Data

US 2006/0256935 A1  Nov. 16, 2006

(30) Foreign Application Priority Data

Mar. 29, 2005 (GB) .................... 0506196.5

(51) Int. Cl.
*H04L 12/28* (2006.01)
*H04L 12/66* (2006.01)

(52) U.S. Cl. ............... 370/351; 370/352; 370/356; 379/88.17; 379/8; 379/88.18; 379/807.16; 379/21; 379/88.2; 709/310; 709/203; 717/105; 717/106; 704/278

(58) Field of Classification Search ............ 379/21, 379/88.18, 88.2, 93.01, 201.1, 207.16, 88.17; 370/252, 351, 352, 356; 704/270.01; 705/2; 707/3, 100; 709/203, 310; 717/105, 106; 719/310

See application file for complete search history.

(56) References Cited

U.S. PATENT DOCUMENTS

| | | | |
|---|---|---|---|
| 5,367,609 A * | 11/1994 | Hopper et al. ............... 704/278 |
| 5,625,682 A * | 4/1997 | Gray et al. ............... 379/207.16 |
| 5,787,153 A * | 7/1998 | Bankay et al. ............ 379/88.18 |
| 5,867,494 A * | 2/1999 | Krishnaswamy et al. ..... 370/352 |
| 5,867,495 A * | 2/1999 | Elliott et al. ................. 370/352 |
| 5,999,525 A * | 12/1999 | Krishnaswamy et al. ..... 370/352 |
| 6,016,336 A | 1/2000 | Hanson |
| 6,061,433 A | 5/2000 | Polcyn et al. |
| 6,335,927 B1 * | 1/2002 | Elliott et al. ................. 370/352 |
| 6,356,876 B1 | 3/2002 | Lingham |
| 6,731,625 B1 * | 5/2004 | Eastep et al. ................. 370/352 |
| 6,754,181 B1 * | 6/2004 | Elliott et al. ................. 370/252 |
| 6,757,365 B1 * | 6/2004 | Bogard .................... 379/88.17 |
| 6,909,708 B1 * | 6/2005 | Krishnaswamy et al. ..... 370/352 |
| 6,941,310 B2 * | 9/2005 | Ahad et al. .................. 707/100 |
| 6,996,800 B2 * | 2/2006 | Lucassen et al. ............ 717/106 |
| 7,016,845 B2 * | 3/2006 | Vora et al. ................ 704/270.1 |
| 7,028,306 B2 * | 4/2006 | Boloker et al. .............. 719/310 |
| 7,039,165 B1 * | 5/2006 | Saylor et al. ............. 379/88.18 |
| 7,145,898 B1 * | 12/2006 | Elliott ......................... 370/352 |
| 7,174,534 B2 * | 2/2007 | Chong et al. ................. 717/105 |
| 7,194,069 B1 * | 3/2007 | Jones et al. ............... 379/88.02 |
| 7,209,916 B1 * | 4/2007 | Seshadri et al. ................. 707/3 |
| 7,233,655 B2 * | 6/2007 | Gailey et al. ........... 379/210.01 |
| 7,286,521 B1 * | 10/2007 | Jackson et al. .............. 370/352 |
| 2002/0064149 A1 * | 5/2002 | Elliott et al. ................. 370/352 |
| 2002/0075844 A1 * | 6/2002 | Hagen ........................ 370/351 |
| 2002/0076032 A1 | 6/2002 | Rodriguez et al. |
| 2002/0128908 A1 * | 9/2002 | Levin et al. .................... 705/14 |
| 2002/0144233 A1 * | 10/2002 | Chong et al. ................. 717/105 |

(Continued)

*Primary Examiner*—William D Cumming (57) ABSTRACT

A communication system includes a data base storing voice applications corresponding to programs executable by user equipment and user profiles. The voice applications are arranged to provide assistance in relation to the programs. A communication handler causes execution of a voice application from the data base responsive to user identification data.

13 Claims, 3 Drawing Sheets

U.S. PATENT DOCUMENTS

| | | | |
|---|---|---|---|
| 2002/0194388 A1* | 12/2002 | Boloker et al. | 709/310 |
| 2003/0023953 A1* | 1/2003 | Lucassen et al. | 717/106 |
| 2003/0092972 A1* | 5/2003 | Mantilla et al. | 600/300 |
| 2003/0097278 A1* | 5/2003 | Mantilla et al. | 705/2 |
| 2003/0103618 A1 | 6/2003 | Brown et al. | |
| 2003/0179865 A1 | 9/2003 | Stillman et al. | |
| 2004/0015504 A1* | 1/2004 | Ahad et al. | 707/100 |
| 2004/0071275 A1 | 4/2004 | Bowater et al. | |
| 2004/0093216 A1* | 5/2004 | Ashish et al. | 704/270.1 |
| 2004/0122941 A1 | 6/2004 | Creamer et al. | |
| 2005/0273759 A1* | 12/2005 | Lucassen et al. | 717/105 |
| 2006/0233314 A1* | 10/2006 | Tofts et al. | 379/21 |
| 2006/0256935 A1* | 11/2006 | Tofts et al. | 379/88.2 |
| 2008/0013704 A1* | 1/2008 | Hyerle | 379/201.1 |
| 2008/0095147 A1* | 4/2008 | Jackson et al. | 370/356 |
| 2008/0095339 A1* | 4/2008 | Elliott et al. | 379/93.01 |
| 2008/0140767 A1* | 6/2008 | Rao et al. | 709/203 |

* cited by examiner

COMMUNICATION DATA METHOD AND SYSTEM FOR VOICE APPLICATIONS EXCECUTABLE BY USER EQUIPMENT

RELATED APPLICATIONS

The present application is based on, and claims priority from, United Kingdom Application Number 0506196.5, filed Mar. 29, 2005, the disclosure of which is hereby incorporated by reference herein in its entirety.

FIELD

The present invention relates to a communication system and method.

BACKGROUND

Communication systems or computer aided telephony systems are examples of data-processing systems in which a series of automated voice menus prompt a caller or user to press the selective keys on their telephone to achieve a number of purposes. For example the purposes may be to obtain banking services or other financial services, billing queries, assistance or other support services.

A caller is usually presented with a number of fixed voice menu options presented by a voice application that represents a first layer of options in a tree of voice menu options that, by appropriate selection, will lead the caller to the required assistance or other service automatically, that is, without human intervention. In essence, each layer of voice menu options aims to discover in a progressive manner a caller's intention. Alternatively, the various layers of voice menu options may lead the caller to a human assistant, which has the advantage of providing the human assistant with information relating to the caller's intention or reason for the call in preparation for meeting the caller's needs.

It will be appreciated that in either circumstance the voice menu options presented are fixed, that is, a standard voice application is created to deal with all queries regardless of any a priori knowledge. It will be appreciated that traversing such a standard voice application can be time-consuming and even frustrating for the caller.

It is an object of embodiments of the present invention to at least mitigate one or more of the problems of the prior art.

SUMMARY OF INVENTION

Accordingly, embodiments of the present invention provide a communication system comprising means to process identification data associated with a communication; means, responsive to the identification data, to access a data base to invoke at least one voice application arranged to provide assistance in relation to at least one program; the data base having been configured to comprise the at least one voice application in response to at least one program being executable by the user equipment.

Advantageously, it will be appreciated that the time taken to address a caller's likely reason for calling can be reduced by attempting to anticipate, in light of prevailing knowledge of, or relating to, programs used by the caller.

Embodiments provide a communication system in which the data base is configured to comprise the voice application in response to a known problem associated with the application and in which the voice application provides support in relation to that problem. Suitably, prior knowledge of a fault associated with a program used, or accessible, by the caller can reasonably be expected to be behind the caller's motivation for calling. Therefore, configuring or constructing a voice application comprising an entry or entries relating to a known problem or problems of a program or programs respectively might further reduce the time taken for a caller to be directed to appropriate assistance.

Many support services of companies or other enterprises are available via a telephone number known as, for example, a helpline. Accordingly, embodiments provide a communication system in which the communication is a telephone call. In such circumstances, the identification data comprises at least one of calling line identification data (CLID), dialed number identification service attribute values (DNIS), Calling Number Identification (CNI), AIN equipment or services or any other telephony identification data or identification data associated with the user or equipment accessible to, or used by, the user.

Other companies or enterprises are known to provide assistance via a communication networks such as, for example, the Internet. Therefore, embodiments provide a communication system in which the communication comprises a data communication having at least one data packet. The at least one data packet may comprise the identification data. It will be appreciated that the identification data might comprise network data such as, for example, an Internet Protocol address or other address that can be associated uniquely with a caller.

A voice application may comprise a single menu option or a number of menu options. The single menu option, in embodiments of the present invention, can relate to a corresponding fault associated with a program known to be used, or accessible, by the caller. Suitably, embodiments provide a communication system in which the at least one voice application comprises at least a one menu option associated with the at least one program.

Embodiments can be realised in which a program is known to have a number of associated issues. Accordingly, embodiments provide a communication system in which the at least one voice application comprises a plurality of menu options associated with the program.

A caller, typically, has access to and uses more than one program. Therefore, embodiments provide a communication system in which the at least one voice application comprises a plurality of menu options; each option being associated with a respective program of a plurality of programs. Each of the menu options can be associated with a fault of a respective program of the program or a selected number of programs accessible to the caller.

Embodiments can be realised that provide a communication system comprising a plurality of voice applications each comprising a respective menu option; each voice application being associated with a respective program of a plurality of programs.

It will be appreciated by one skilled in the art that appropriate research would be useful in tailoring the voice applications in anticipation of a caller's requirements. Accordingly, embodiments provide a data processing method comprising creating in, at least one voice application, at least one menu option associated with at least one program accessible by a user; associating user identification data with the voice application to access the voice application in response to receiving the identification data; the user identification data being derived from communication data associated with the user.

Embodiments provide a data processing method comprising the step of configuring the voice application such that the at least one menu option relates to a known fault associated with the program.

Embodiments provide a data processing method comprising the step of creating the at least one menu option such that it comprises data relating to instructions to effect a predetermined action to obtain assistance in relation to the known fault.

Embodiments provide a data processing method in which the step of creating the at least one menu option comprises the step of creating a plurality of menu options such that each menu option of the plurality of menu options relates to a respective known fault of a plurality of faults.

Embodiments provide a data processing system in which the step of creating, in the at least one voice application, at least one menu option comprises the step of configuring a plurality of voice applications associated with at least one respective fault of a plurality of known fault associated with the at least one program.

It will be appreciated that embodiments of the present invention can be realised in the form of hardware, software or a combination of hardware and software. Any such software can be stored via a number of mediums such as magnetic or optically readable discs, chips, memory cards, memory sticks or any other volatile or non-volatile medium. Accordingly, embodiments provide a computer program comprising code to implement a system or method described herein. Embodiments also provide computer readable storage storing such a computer program.

BRIEF DESCRIPTION OF THE DRAWINGS

Embodiments of the present invention will now be described, by way of example only, with reference to the accompanying drawings in which.

DETAILED DESCRIPTION OF EMBODIMENTS

Figure 1:
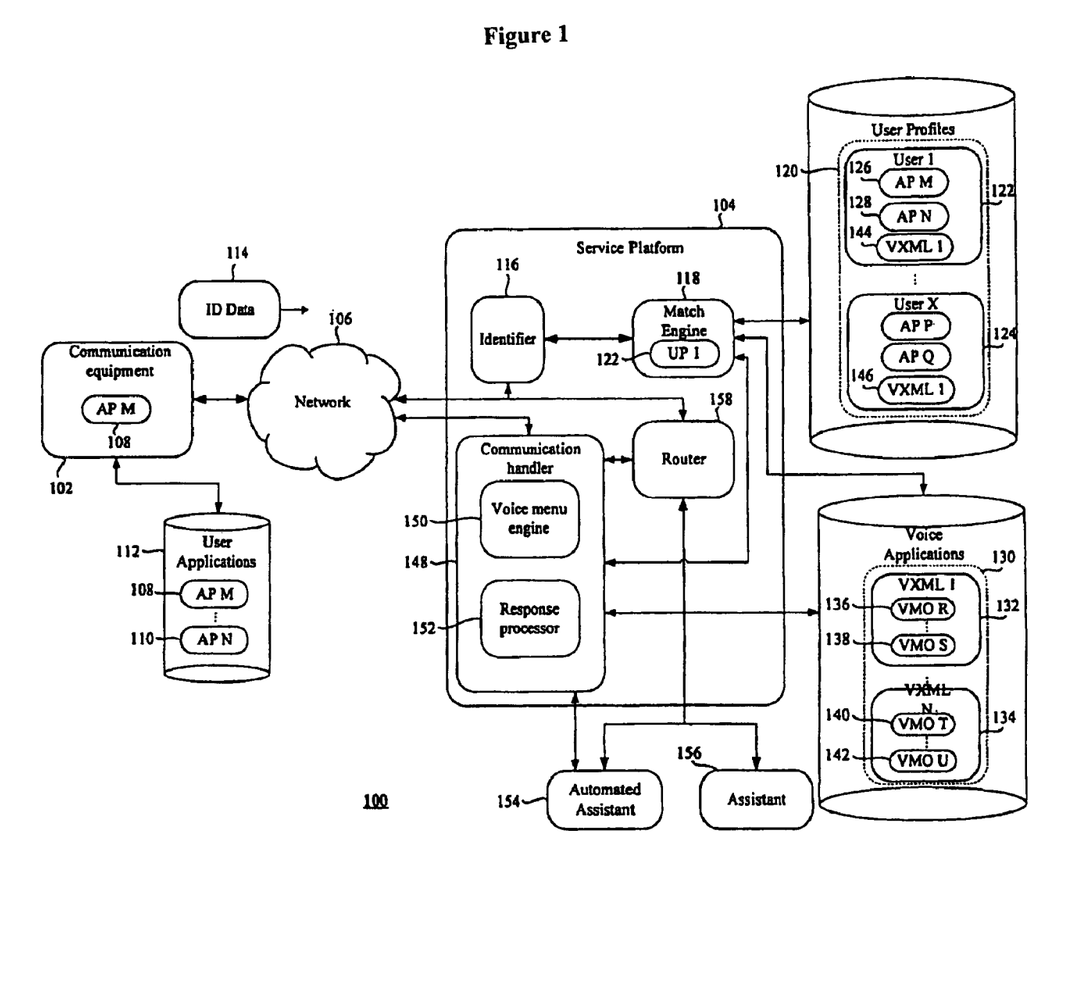
FIG. 1 shows a communication arrangement comprising a communication system according to an embodiment.

Referring to FIG. 1, there is shown a communication arrangement 100 in which a user (not shown) communicates, using communication equipment 102, with a service platform 104 via a communication network 106.

The user equipment 102 allows the user access to a number of applications 108 to 110 stored on, for example, an HDD 112. The user equipment 102 is illustrated as executing a first application 108. The user equipment can be, for example, a computer, a telephone, fax machine or any other communication equipment.

The user of the communication equipment 102 can obtain assistance relating to any or all of the applications 108 to 110 accessible to the user of that equipment 102. To obtain any such assistance, the communication equipment 102 is used to establish a communication with the service platform 104. Identification data 114 that uniquely identifies at least one of the user and the communication equipment 102 or, preferably, both, is transmitted to the service platform 104 as part of the communication set up protocol. However, any such identification data 114 could be transmitted to the service platform 104 at some other convenient time.

The service platform 104 comprises an identifier 116 that extracts the identification data 114 from any communication with the communication equipment 102. The identifier 116 forwards the identification data 114, or data derived therefrom, to a match engine 118 that uses the identification data 114 to retrieve, from a user profiles database 120, the user profile associated with the identification data 114 and, in turn, with the user of the communication equipment 102. It will be appreciated that the match engine 118 is shown as having retrieved or identified a match between the identification data 114 and a user profile 122 stored within the user profiles database 120.

The user profiles database 120 is shown as comprising at least one user profile such as the user profile 122 matching the identification data 114. It will also be appreciated that a second or further user profile 124, corresponding to a different user, is also illustrated. The user profiles database 120 may comprise any convenient number of user profiles.

Each user profile is arranged to contain an indication of the applications accessible by the communication equipment 102. Taking the first user profile 122 as an example, it can be appreciated that it contains data 126 and 128 respectively identifying the applications 108 to 110 accessible or used by the communication equipment 102. Therefore, in response to a communication from the user equipment 102, it is reasonable to assume that any such communication is related to one of the applications 108 to 110.

The match engine 118, in light of the above assumption, also has access to a voice applications database 130 that contains a number of voice applications 132 to 134. The voice applications database 130 may comprise one voice application or more than one voice application according to requirements even though two voice applications 132 and 134 are illustrated. Each voice application 132 to 134 comprises a number of voice menu options. For example, the first voice application 132 comprises voice menu options 136 to 138 but can comprise any convenient or appropriate number of menu options according to the anticipated needs of a user. Similarly, the other voice application 134 also comprises a number of voice menu options 140 to 142. Each voice application 132 to 134 has been illustrated as comprising respective pairs of voice menu options. However, each voice application 132 to 134 can comprise any appropriate or convenient number of voice menu options.

Each voice application 132 to 134 is arranged to correspond to a respective user profile. It can be appreciated that each user profile 122 to 124 comprises an indication 144 to 146 of a respective voice application. The voice application indications 144 to 146 are used by the match engine 118 as an index to retrieve an appropriate voice application from the voice applications database 130.

The voice menu options can be expressed in many forms such as, for example, text, for processing by a text-to-speech engine, or digitised speech. The voice application menu options are used to output data as part of an interaction with the user via the communication equipment 102 in an attempt to determine the user's reason for the communication. Each voice menu option is associated with a respective application of the applications 108 to 110 accessible via the communication equipment 102. Therefore, by tailoring the voice applications 132 to 134 according to the contents of the user profiles 122 to 124, the user should have a more focused interaction with the service platform 104, that is, the user will be presented with voice menu options that are potentially more relevant to the user than voice menu options presented by a more generic voice application of, or voice interface to, the service platform 104.

An embodiment can be realised in which a voice application is constructed not only in light of the applications 108 to 110 accessible via the communication equipment 102 but also in light of known issues associated with one or more of those applications 108 to 110. For example, application 108 may have a known fault or bug. Therefore, the first voice application 132 associated with the first user profile 122 corresponding to the user of the communication equipment 102 or the communication equipment 102 itself may comprise a voice menu option relating to that fault or bug. It will be appreciated by one skilled in the art that further tailoring the voice applications in such a manner may lead to the service platform 104 being able to provide the user with assistance or being able to direct the user to assistance in a more focused manner.

Having identified a voice application such as the first voice application 132 as being relevant to an incoming or established communication, the voice application 132 is forwarded to a communication handler 148. The communication handler 148 is responsible for managing the exchange or communication between the user of the communication equipment 102 and the voice application. In essence, the communication handler 148 is responsible for executing, or at least overseeing the execution, of the voice application 132.

The communication handler 148 comprises a voice menu engine 150 responsible for outputting audible data representing digitised speech according to the voice menu options contained within a voice application currently being processed.

The communication handler 148 comprises a response processor 152 responsible for processing and identifying the user's responses to the voice menu options. The response processor 152 can be arranged to invoke further voice applications or to direct the user to, for example, an automated assistant 154 or a human assistant 156 via a router 158 according to the responses of the user to the output menu options. The automated assistant 154 may take the form of at least one further voice application or any other form of automated assistance.

It will be appreciated from FIG. 1 that the voice applications are indicated as being expressed in VoiceXML. However, the voice applications may be expressed or realised in any other suitable form.

Although the embodiment described above uses the identification data 114 as an index to retrieve a corresponding user profile from the user profiles database 120, embodiments are not limited to such an arrangement. Embodiments can be realised in which data derived from the identification data 114 is used as such an index. The identification data may be subjected to preprocessing in the form of, for example, a hashing algorithm, to arrive at an index suitable to use with the user profiles database 120.

The above communication arrangement 100 has been described using a generic reference to a communication network 106. Embodiments of such a communication network 106 may take the form of any communication network such as, for example, the Internet, a wired or wireless LAN, or any other type of network supporting communications. The generic reference to communication network 106 also encompasses a cable connection used to couple the communication equipment 102 to the service platform 104.

Although the communication arrangement 100 described with reference to FIG. 1 indicates that the communication equipment 102 is responsible for both executing the applications 108 to 110 and supporting the communications with the service platform 104, arrangements can be realised in which such functions are separated. For example, if the communication equipment 102 is realised in the form of a computer that does not support telephony, the communications with the service platform 104 can be supported using a telephone such as is described below with reference to FIG. 2.

The communication arrangement 100 above has been described with reference to the identification data 114 being associated with a user. However, other arrangements can be realised such as, for example, arrangements in which the identification data 114 is associated with the communication equipment 102 rather than with any specific user.

Figure 2:
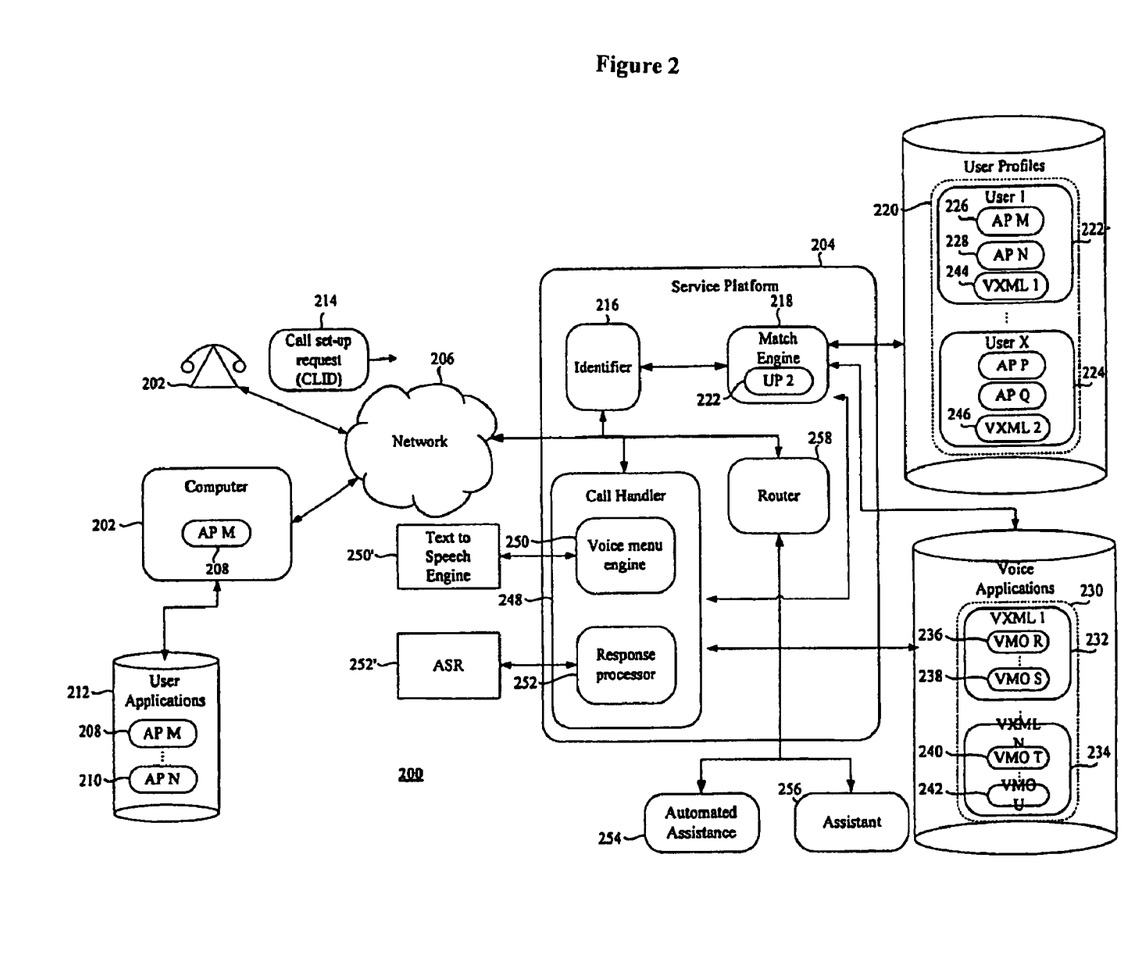
FIG. 2 shows a communication arrangement comprising a computer aided telephony system according to an embodiment.

Referring to FIG. 2, there is shown a computer aided telephony arrangement 200 that is a telephony based embodiment of the more general communication arrangement 100 shown in and described with reference to FIG. 1.

The computer aided telephony arrangement 200 allows a caller (not shown) to communicate, using a telephone 202, with a computer aided telephony system 204 via a communication network 206.

The user has access to a computer 202' that allows the user to access a number of applications 208 to 210 stored on, for example, an HDD 212. The computer 202' is illustrated as executing a first application 208. The telephone 202 can be any type of telephone such as, for example, a POTS, a VoIP phone, a wireless telephone or any other type of telephone or communication device.

The user of the computer 202' can obtain assistance relating to any or all of the applications 208 to 210 accessible to the user of that computer 202'. To obtain any such assistance, the telephone 202 is used to establish a call with the computer aided telephony system 204. It will be appreciated that the term "call" is a species of the class "communication". Identification data 214 that uniquely identifies at least one of the user or the telephone 202 or, preferably, both, is transmitted to the computer aided telephony system 204 as part of the communication set up protocol. The identification data can comprise Calling Line Identification Data (CLID), Dialed Number Identification Service attribute values (DNIS), Calling Number Identification (CNI), AIN equipment or services or any other telephony identification data or identification data associated with the user or equipment accessible to or used by the user. However, any such identification data 214 could be transmitted to the computer aided telephony system 204 at some other convenient time.

The computer aided telephony system 204 comprises an identifier 216 that extracts the identification data 214 from any communication exchange with the telephone 202. The identifier 216 forwards the identification data 214, or data derived therefrom, to a match engine 218 that uses the identification data 214 to retrieve, from a user profiles database 220, the user profile associated with the identification data 214 and, in turn, with the user of the telephone 202. It will be appreciated that the match engine 218 is shown as having retrieved or identified a match between the identification data 214 and a user profile 222 stored within the user profiles database 220.

The user profiles database 220 is, for purposes of illustration, shown as comprising at least one user profile such as the user profile 222 matching the identification data 214. It will also be appreciated that a second or further user profile 224, corresponding to a different user, is also illustrated. The user profiles database 220 may comprise any convenient number of user profiles.

Each user profile is arranged to contain an indication of the applications accessible to the user via the computer 202'. Taking the first user profile 222 as an example, it can be appreciated that it contains data 226 and 228 respectively identifying the applications 208 to 210 accessible or used by the computer 202'. Therefore, in response to a communication from the telephone 202, it is reasonable to assume that any such communication is related to one of the applications 208 to 210.

The match engine 218, in light of the above assumption, also has access to a voice applications database 230 that contains a number of voice applications 232 to 234. The voice applications database 230 may comprise one voice application or more than one voice application according to requirements even though only two voice applications 232 and 234 are illustrated. Each voice application 232 to 234 comprises a number of voice menu options. For example, the first voice application 232 comprises voice menu options 236 to 238 but can comprise any convenient or appropriate number of menu options according to the anticipated needs of a user. Similarly, the other voice application 234 also comprises a number of voice menu options 240 to 242. Each voice application 232 to 234 has been illustrated as comprising respective pairs of voice menu options. However, each voice application 232 to 234 can comprise any appropriate or convenient number of voice menu options.

Each voice application 232 to 234 is arranged to correspond to a respective user profile. It can be appreciated that each user profile 222 to 224 comprises an indication 244 to 246 of a respective voice application. The voice application indications 244 to 246 are used by the match engine 218 as an index to retrieve an appropriate voice application from the voice applications database 230.

The voice menu options can be expressed in many forms such as, for example, text, for processing by a text-to-speech engine, or digitised speech. The voice application menu options are used to output data as part of an interaction with the user via the telephone 202 in an attempt to determine the user's purpose in making the call. Each voice menu option is associated with a respective application of the applications 208 to 210. Therefore, by tailoring the voice applications 232 to 234 according to the contents of the user profiles 222 to 224, the user should have a more focused interaction with the computer aided telephony system 204, that is, the user will be presented with voice menu options that are potentially more relevant to the user than voice menu options presented by a more generic voice application of, or voice interface to, the computer aided telephony system 204.

An embodiment can be realised in which a voice application is configured or constructed not only in light of the applications 208 to 210 accessible via the computer 202' but also in light of known issues associated with one or more of those applications 208 to 210. For example, application 208 may have a known fault or bug. Therefore, the first voice application 232 associated with the first user profile 222 corresponding to the caller may comprise a voice menu option relating to that fault or bug. It will be appreciated by one skilled in the art that further tailoring the voice applications in such a manner may lead to the computer aided telephony system 204 being able to provide the user with assistance or being able to direct the user to assistance in a more focused manner.

Having identified a voice application such as the first voice application 232 as being relevant to an incoming or established call, the voice application 232 is forwarded to a communication handler 248. The communication handler 248 is responsible for managing the exchange or communication between the user of the telephone 202 and the voice application. In essence, the communication handler 248 is responsible for executing, or at least overseeing the execution, of the voice application 232.

The communication handler 248 comprises a voice menu engine 250 responsible for outputting audible data representing digitised speech according to the voice menu options contained within a voice application currently being processed. The voice menu engine 250 achieves this by extracting, for example, text, assuming the voice menu options are expressed using text, from the menu options and forwarding the text to a text-to-speech engine 250' for conversion of the text to speech data.

The communication handler 248 comprises a response processor 252 responsible for processing and identifying the user's responses to the voice menu options. The response processor 252 uses an automatic speech recogniser (ASR) 252' to process data representing the responses of the user to the voice menu options. The data representing the responses can take the form of DTMF tones or other signals generated using the telephone or caller articulations that are processed by the ASR. The ASR outputs data reflecting the caller's responses to the menu options to the response processor. The response processor 252 can be arranged to invoke further a voice application or to direct the user to, for example, an automated assistant 254 or a human assistant 256 via a router 258 according to the responses of the user to the output menu options. The automated assistant 254 may take the form of at least one further voice application or any other form of automated assistance.

It will be appreciated from FIG. 2 that the voice applications are indicated as being expressed in VoiceXML, in which case the voice menu engine 250 may be a VoiceXML interpreter. However, the voice applications may be expressed or realised in any other suitable form.

Although the embodiment described above uses the identification data 214 as an index to retrieve a corresponding user profile from the user profiles database 220, embodiments are not limited to such an arrangement. Embodiments can be realised in which data derived from the identification data 214 is used as an index. For example, the identification data may be subjected to preprocessing in the form of, for example, a hashing algorithm, to arrive at an index suitable for use with the user profiles database 220.

The above computer aided telephony arrangement 200 has been described using a generic reference to a communication network 206. Embodiments of such a communication network 206 may take the form of any communication network such as, for example, the Internet, a wired or wireless LAN, a PSTN or mobile communication network or any other type of network supporting telephony communications. The generic reference to communication network 206 also encompasses a cable used to couple the telephone 202 to the computer aided telephony system 204.

The computer aided telephony arrangement 200 above has been described with reference to the identification data 214 being associated with the telephone. However, other arrangements can be realised such as, for example, arrangements in which the identification data 214 is associated with the computer 202' or a communication protocol associated with the telephone 202 or computer 202', network or application rather than with the telephone specifically. For example, identification data relating to the computer 202' such as, for example, an IP address might be used. However, such an embodiment would require the computer aided telephony system 204 to correlate the telephone call with a communication established, or to be established, with the computer 202'.

Figure 3:
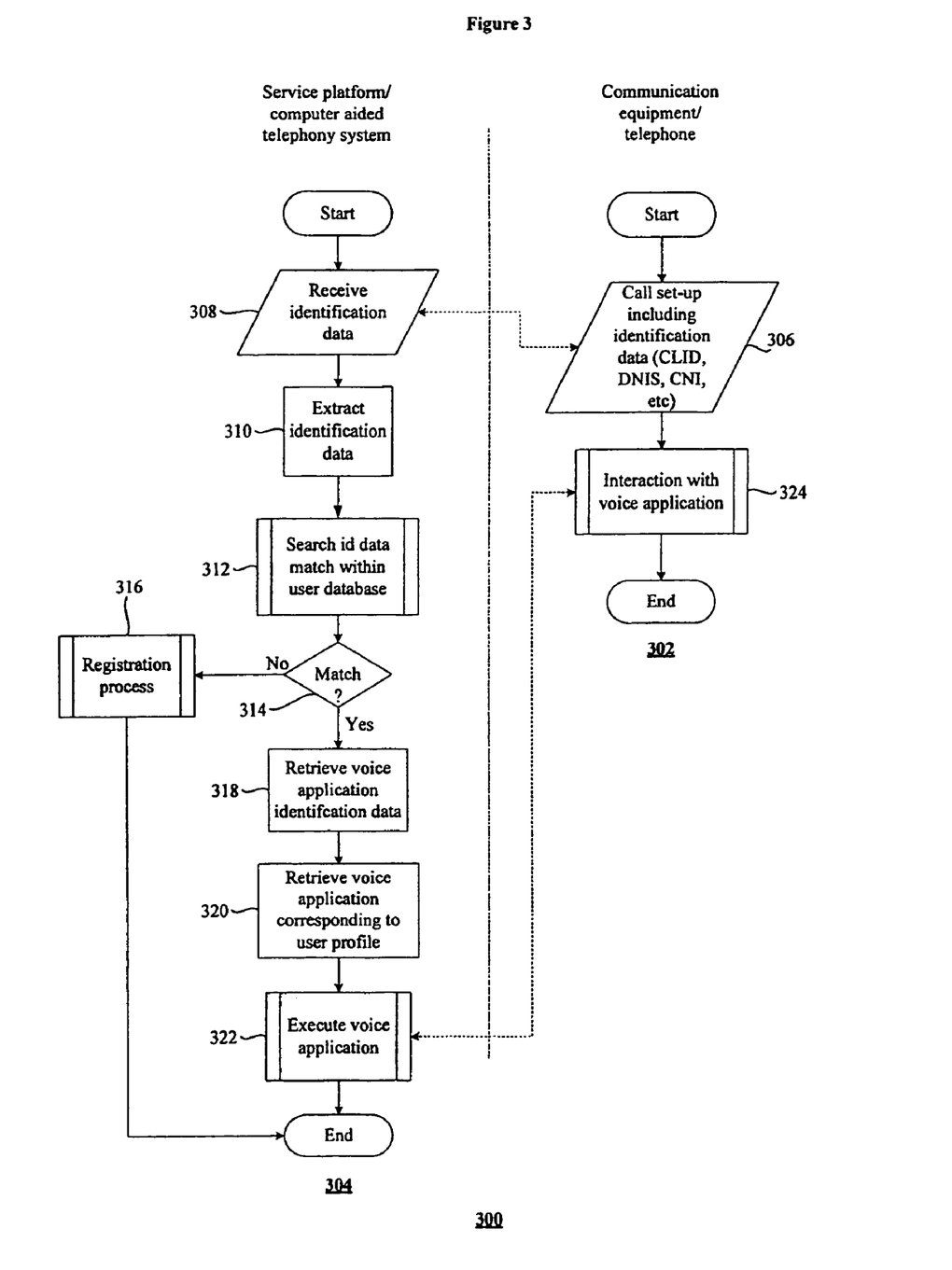
FIG. 3 shows flow charts relating to the operation of the embodiments.

Referring to FIG. 3 there is shown a pair of flow charts 300 depicting the processing undertaken by the above embodiments. A first flow chart 302 of the pair of flow charts 300 relates to processing activities undertaken by equipment such as the telephone 202, computer 202' or communication equipment 102 used by a user or a caller. A second flow chart 304 illustrates the processing undertaken by the service platform 104 or computer aided telephony system 204. The flow charts will be described with reference to FIG. 2. However, the flow charts 300 are equally applicable to the communication arrangement shown in and described with reference to FIG. 1.

At step 306, the caller establishes or at least instigates a call to the computer aided telephony system 204. Step 306 also includes forwarding identification data such as, for example, the CLID, DNIS attribute values, CNI or AIN data. The call set up data, including the identification data, is received at the computer aided telephony system 204 at step 308. The identification data is extracted or identified at step 310 and forwarded to the match engine 218. A search is performed at step 312 to determine whether or not the user profiles database 220 contains a user profile matching the extracted identification data. A determination is made at step 314 as to whether or not such a match exists. If it is determined that such a match does not exist, processing continues at step 316 where the caller is invited to take part in a registration process to collate data from which an appropriate user profile can be constructed. If the determination at step 314 is that a user profile corresponding to the extracted identification data does exist, the voice XML indication contained within the appropriate user profile is retrieved or identified at step 318 and used, at step 320, to retrieve a voice application corresponding to the user profile. The voice application is executed at step 322 which invariably involves an exchange or interaction with the caller as indicated by the process shown at step 324.

Returning to the registration process undertaken at step 316, the details relating to the applications 208 to 210 used or accessible by the user are collated. Any such collation can be achieved in a number of ways. For example, the caller could be directed to a web page that has an embedded executable entity, such as an applet or the like, responsible for identifying the applications 208 to 210 used by or accessible to the computer 202'. As a refinement, the user can be presented with the list of applications identified by the executable entity and requested to select from such a list those applications to be registered with the computer aided telephony system 204 as being of interest.

Although the above embodiments make reference to applications, it will be appreciated that they are not limited to constructing a user profiles database relating to applications. Also, applications are merely species of the more generic class "programs". Also, it will be appreciated that the service platform 104 and the computer aided telephony system 204 are realisations of a communication system or at least part of such a system.

The user profiles databases 120 and 220 and the voice applications databases 130 and 230 have been shown as separate databases. However, embodiments can be realised in which the databases are combined. For example, each user profile within the user profiles databases 120 and 230 could be arranged to contain the voice applications themselves rather than merely indexes that are used to access such voice applications.

Embodiments can be realised in which a menu option can be presented to a caller or user to allow them to run the registration process described with reference to step 316 to update the programs registered with the service platform 104 or computer aided telephony system 204 as being associated with the caller or user.

The invention claimed is:

1. A communication system, comprising:
a data base configured to store voice applications and user profiles, each voice application corresponding to a stored user profile for a user and corresponding to programs executable by user equipment for the user,
wherein each of the user profiles contains an indication of the programs executable by the user equipment for the user, and each of the user profiles contains an indication of the corresponding voice application, and
each of the voice applications contains at least one menu option associated with at least one of the programs corresponding to the voice application, and
each voice application is arranged to provide assistance in relation to at least one of the programs corresponding to the voice application, and the at least one menu option for the voice application provides the assistance;
an identifier configured to process identification data associated with a communication and a user profile;
a match engine configured to use the identification data to retrieve from the database the user profile associated with the identification data, and the match engine is configured to use the indication of the corresponding voice application in the user profile associated with the identification data as an index to retrieve the corresponding voice application from the data base; and
a communication handler configured to cause execution of the retrieved voice application from the data base responsive to the matching engine identifying the user profile from the data base, wherein the executed voice application corresponds to the identified user profile and the at least one of the programs for the user of the identified user profile.

2. A communication system as claimed in claim 1 in which the data base is configured to comprise the voice application in response to a known problem associated with the at least one of the programs and in which the voice application provides support in relation to that problem.

3. A communication system as claimed in claim 1 in which the communication is a telephone call.

4. A communication system as claimed in claim 3 in which the identification data comprises at least one of Calling Line Identification Data (CLID), Dialed Number Identification Service attribute values (DNIS), Calling Number Identification (CNI), AIN equipment or services or any other telephony identification data or identification data associated with the user or equipment accessible tom or used by, a user.

5. A communication system as claimed in claim 1 in which the communication comprises a data communication having at least one data packet.

6. A communication system as claimed in claim 5 in which the at least one data packet comprises the identification data.

7. A communication system as claimed in claim 6 in which the identification data comprises network data.

8. A communication system as claimed in claim 7 in which the network data comprises an Internet Protocol address.

9. A communication system as claimed in claim 1 in which the voice application comprises a plurality of menu options associated with the at least one of the programs.

10. A communication system as claimed in claim 1 in which the voice application comprises a plurality of menu options;
each option being associated with a respective program of the programs corresponding to the user profile and the voice application.

11. A communication system as claimed in claim 1 wherein each voice application is associated with a respective program of a plurality of programs.

12. A data processing method comprising:
storing voice applications and user profiles in a data base in computer storage, each voice application corresponding to a stored user profile for a user and corresponding to programs executable by user equipment for the user, wherein each of the user profiles contains an indication of the programs executable by the user equipment for the user, and each of the user profiles contains an indication of the corresponding voice application, and each of the voice applications contains at least one menu option associated with at least one of the programs corresponding to the voice application wherein the at least one menu option is configured to output data based on an interaction with the user equipment;

receiving identification data associated with a communication and a user profile;

using the identification data to retrieve from the data base the user profile associated with the identification data;

using the indication of the corresponding voice application in the user profile associated with the identification data as an index to retrieve the corresponding voice application from the data base; and causing execution of the retrieved voice application from the data base.

13. A communication system comprising:

data storage means for storing voice applications and user profiles, each voice application corresponding to a stored user profile for a user and corresponding to programs executable by user equipment for the user, wherein each of the user profiles contains an indication of the programs executable by the user equipment for the user, and each of the user profiles contains an indication of the corresponding voice application, and each of the voice applications contains at least one menu option associated with at least one of the programs corresponding to the voice application, and each voice application is arranged to provide assistance in relation to at least one of the programs corresponding to the voice application, and the at least one menu option for the voice application provides the assistance;

means for processing identification data associated with a communication;

a match engine means for using the identification data to retrieve from the database the user profile associated with the identification data, and for using the indication of the corresponding voice application in the user profile associated with the identification data as an index to retrieve the corresponding voice application from the data storage means; and means for executing the retrieved voice application arranged to provide assistance in relation to at least one the programs corresponding to the retrieved voice application.

* * * * *